(12) United States Patent
Grim et al.

(10) Patent No.: US 10,921,519 B2
(45) Date of Patent: Feb. 16, 2021

(54) DETERMINISTIC FREQUENCY TUNING OF QUANTUM DOTS IN PHOTONIC CRYSTAL MEMBRANES USING MICRO-LASER PROCESSING

(71) Applicant: The Government of the United States of America, as represented by the Secretary of the Navy, Arlington, VA (US)

(72) Inventors: Joel Q. Grim, Washington, DC (US); Samuel Carter, Waldorf, MD (US); Allan S. Bracker, Alexandria, VA (US); Daniel Gammon, Waldorf, MD (US)

(73) Assignee: The Government of the United States of America, as represented by the Secretary of the Navy, Washington, DC (US)

( * ) Notice: Subject to any disclaimer, the term of this patent is extended or adjusted under 35 U.S.C. 154(b) by 315 days.

(21) Appl. No.: 16/127,873

(22) Filed: Sep. 11, 2018

(65) Prior Publication Data

US 2019/0079245 A1 Mar. 14, 2019

Related U.S. Application Data

(60) Provisional application No. 62/557,277, filed on Sep. 12, 2017.

(51) Int. Cl.
*G02B 6/13* (2006.01)
*G02B 6/122* (2006.01)
(Continued)

(52) U.S. Cl.
CPC ............... *G02B 6/13* (2013.01); *G02B 1/005* (2013.01); *G02B 6/1225* (2013.01); *H04B 10/70* (2013.01); *B82Y 20/00* (2013.01); *G02B 2006/12078* (2013.01); *G02B 2006/12171* (2013.01)

(58) Field of Classification Search
CPC .................................. G02B 1/005; G02B 6/13
See application file for complete search history.

(56) References Cited

U.S. PATENT DOCUMENTS 6,057,081 A * 5/2000 Yunogami ......... H01L 21/02071
430/313
8,304,757 B2 * 11/2012 Hatori ...................... H01S 5/34
257/13
(Continued)

FOREIGN PATENT DOCUMENTS

KR 10-2017-0044052 A 4/2017

OTHER PUBLICATIONS

C Grillet, C Monat, et., al, "Reconfigurable photonic crystal circuits", Laser & Phontonics Review, vol. 4, issue 2, Feb. 2010, pp. 192-204 (Year: 2010).*

(Continued)

*Primary Examiner* — William Coleman
(74) *Attorney, Agent, or Firm* — US Naval Research Laboratory; Roy Roberts

(57) ABSTRACT

Emission frequency of quantum dots in a photonic crystal membrane can be tuned by laser light treatment. For example, a focused laser can heat InAs quantum dots embedded within a <200 nm photonic crystal GaAs membrane. At temperatures above about 600° C., indium atoms from the quantum dots and gallium atoms from the membrane interdiffuse, alloying the quantum dots with the surrounding membrane. This causes the quantum dots to become more gallium rich, which shifts the emission to higher frequencies.

4 Claims, 4 Drawing Sheets

(51) Int. Cl.
*G02B 1/00* (2006.01)
*H04B 10/70* (2013.01)
*G02B 6/12* (2006.01)
*B82Y 20/00* (2011.01)

(56) References Cited

U.S. PATENT DOCUMENTS

| | | | |
|---|---|---|---|
| 8,355,606 B2* | 1/2013 | Englund | G02B 6/1225 385/16 |
| 8,849,075 B2* | 9/2014 | Painter | G02B 26/001 385/14 |
| 2009/0137102 A1 | 5/2009 | Rooyackers | |
| 2011/0116154 A1 | 5/2011 | Flatte | |
| 2012/0132891 A1 | 5/2012 | Pease | |
| 2013/0092897 A1 | 4/2013 | Shambat et al. | |
| 2014/0291490 A1 | 10/2014 | Hanson et al. | |

OTHER PUBLICATIONS

Tao Yang, et al., "Effects of rapid thermal annealing on the emission properties of highly uniform self-assembled InAs/GaAs quantum dots emitting at 1.3 um", Applied Physics Letters, 90, American Institute of Physics, pp. 111912-1 to 11192-3 (Year: 2007).*

J.M. Garcia, et al, "Electronic states tuning of InAs self-assembled quantum dots", Applied Physics Letters, vol. 72, issue 24, Physical Review B, American Institute of Physics, pp. 16671-16680, Dec. 15, 2000 (Year: 2000).*

International Preliminary Report on Patentability dated Mar. 17, 2020.

* cited by examiner

DETERMINISTIC FREQUENCY TUNING OF QUANTUM DOTS IN PHOTONIC CRYSTAL MEMBRANES USING MICRO-LASER PROCESSING

CROSS-REFERENCE TO RELATED APPLICATIONS

This Application claims the benefit of U.S. Provisional Application 62/557,277 filed on Sep. 12, 2017, the entirety of which is incorporated herein by reference.

BACKGROUND

Single photon emitters (SPEs) are the central component of photonic quantum information (QI) technologies such as quantum computing and communication. Many of the proposed QI protocols require large numbers of quantum bits (qubits), which has motivated the development of solid-state SPEs. InAs/GaAs semiconductor quantum dots (QDs) are presently the best-performing solid-state SPEs, with record generation rates and high single photon purity. They can also be readily integrated into photonic crystal membranes, which are one of the most versatile approaches to creating on-chip photonic networks. Generating indistinguishable photons is an essential capability for QI technologies, but this is the most significant fundamental challenge for all solid-state SPEs due to uncontrolled frequency variation from emitter to emitter (see FIG. 1). Overcoming this challenge for QDs would be a disruptive advance for quantum information.

Most research to date has focused on using temperature, electrical fields, or Raman emission to tune QD emission frequencies in photonic crystals (PhCs). However, these techniques do not permanently change emission frequencies, and therefore require QDs to be individually controlled while the device is being used, which limits the scalability of these approaches.

Strain tuning with piezo-electric actuators can be used for long range tuning, but requires a piezo-electric actuator for every photonic crystal membrane. Further, this technique has not been shown to be capable of tuning different quantum dots independently in a single structure since it applies strain to an entire photonic crystal membrane.

A need exists for an improved method for tuning the emission frequencies of quantum dots in photonic crystal membranes.

BRIEF SUMMARY

Described herein is a technique to deterministically tune quantum dot emission frequencies to create scalable on-chip single photon sources for use in photonic computing, communication, or sensing networks.

In one embodiment, a method of tuning quantum dot emission frequency includes providing a plurality of quantum dots embedded in a photonic crystal membrane; and conducting laser light treatment by directing laser light at one or more of the quantum dots, thereby causing a permanent shift in an emission frequency of the one or more quantum dots.

In further particular embodiments, a focused laser is used to heat InAs quantum dots embedded within a <200 nm photonic crystal GaAs membrane. At temperatures above about 600° C., indium atoms from the quantum dots and gallium atoms from the membrane interdiffuse, alloying the quantum dots with the surrounding membrane. This causes the quantum dots to become more gallium rich, which shifts the emission to higher frequencies.

DETAILED DESCRIPTION

Definitions

Figure 1:
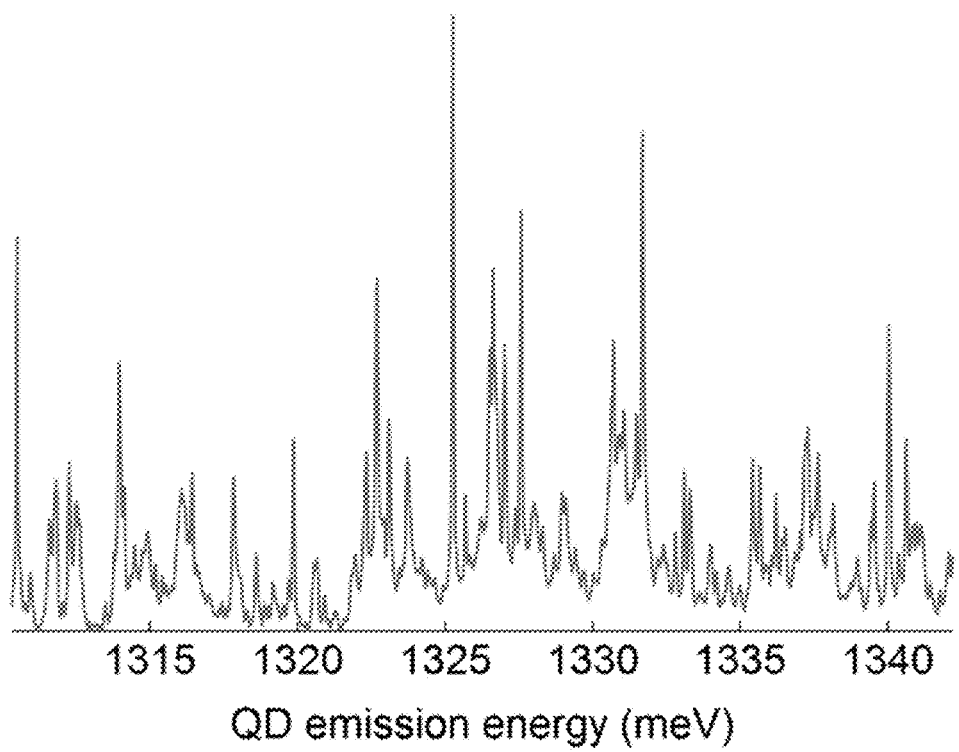
FIG. 1 illustrates a distribution of emission energies of quantum dots.
Figure 2:
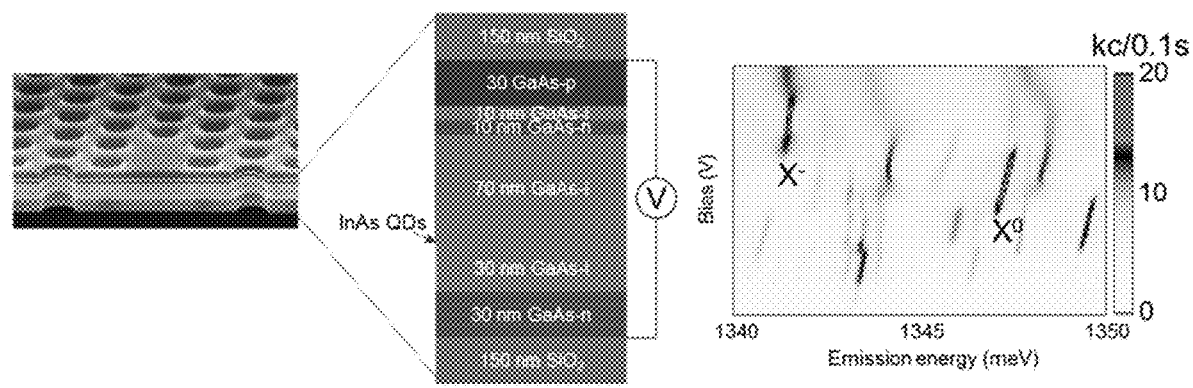
FIG. 2 shows an exemplary photonic crystal membrane diode with embedded quantum dots and a corresponding emission spectrum.
Figure 3:
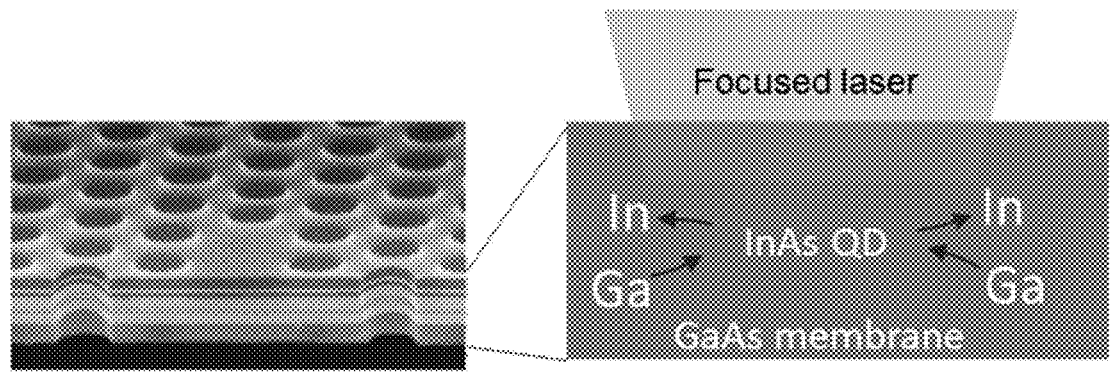
FIG. 3 illustrates an example of laser annealing to tune individual quantum dots. Local laser heating causes an interdiffusion of gallium and indium atoms, changing individual quantum dot band gaps.

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used herein, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

Overview

Described herein is a device and technique that can be used to permanently change individual QD emission frequencies within photonic crystal membrane diodes. Micro-laser processing tunes the emission frequency of individual QDs that are embedded in photonic crystal membrane diodes. A laser is focused down to a ~1 μm spot with a power that is sufficient to raise the temperature of the GaAs membrane to >600° C. The indium atoms in the InAs QDs and the gallium atoms in the GaAs membrane diffuse at these temperatures, which increases the QD bandgap and blue shifts the emission frequency of the QDs. A key feature of this technique is that it can be performed in situ on QDs that are integrated in on-chip photonic network architectures.

It may be desirable to perform the tuning process in a cold environment, such as about 5 to 10 degrees Kelvin. After a period of annealing, the wavelength of the quantum dot emission can be measured and, if necessary to reach a desired result, additional annealing performed on the same quantum dot.

The frequency tuning can be long range (>5 meV) and permanent. The micro-laser processing technique can be performed in situ on QDs embedded in photonic membrane structures that are integrated on-chip to form distributed networks, which reduces fabrication and processing overhead.

The diode structure of the membranes enables controlled charging of the QDs with either electrons or holes, which can be used to create spin qubits. In embodiments, photonic membranes are designed to regulate thermal diffusion which enables controlled micro-laser heating of the environment of the QDs.

EXAMPLES

Proof of concept experiments were performed using self-assembled InAs QDs grown in GaAs photonic crystal membrane diodes. The GaAs photonic crystal membranes were designed to enable temperatures greater than 600° C. at moderate laser powers to mitigate runaway nonlinear processes. This was achieved by confining the heat by incorporating thermal bottlenecks between the photonic crystal membranes and the surrounding substrate. Controlled frequency tuning of QDs was achieved by successive exposures of a heating laser. See FIGS. 4A-5B. This demonstrated the capability of the technique to tune different QDs to the same frequency in different photonic crystal membrane diodes.

Figure 4A:
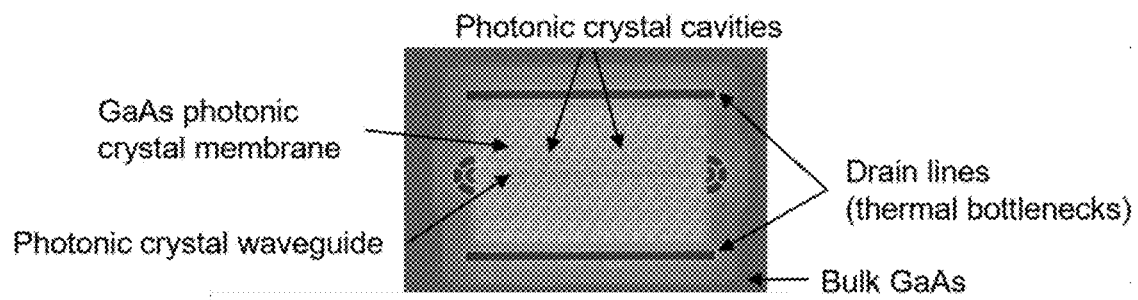
FIGS. 4A and 4B are enlarged and labeled views, respectively, of a scanning electron microscope image of a photonic crystal membrane with embedded InAs quantum dots and thermal bottlenecks to enable low annealing laser powers. This structure contains cavities and a waveguide, ingredients for on-chip photonic networks.
Figure 4B:
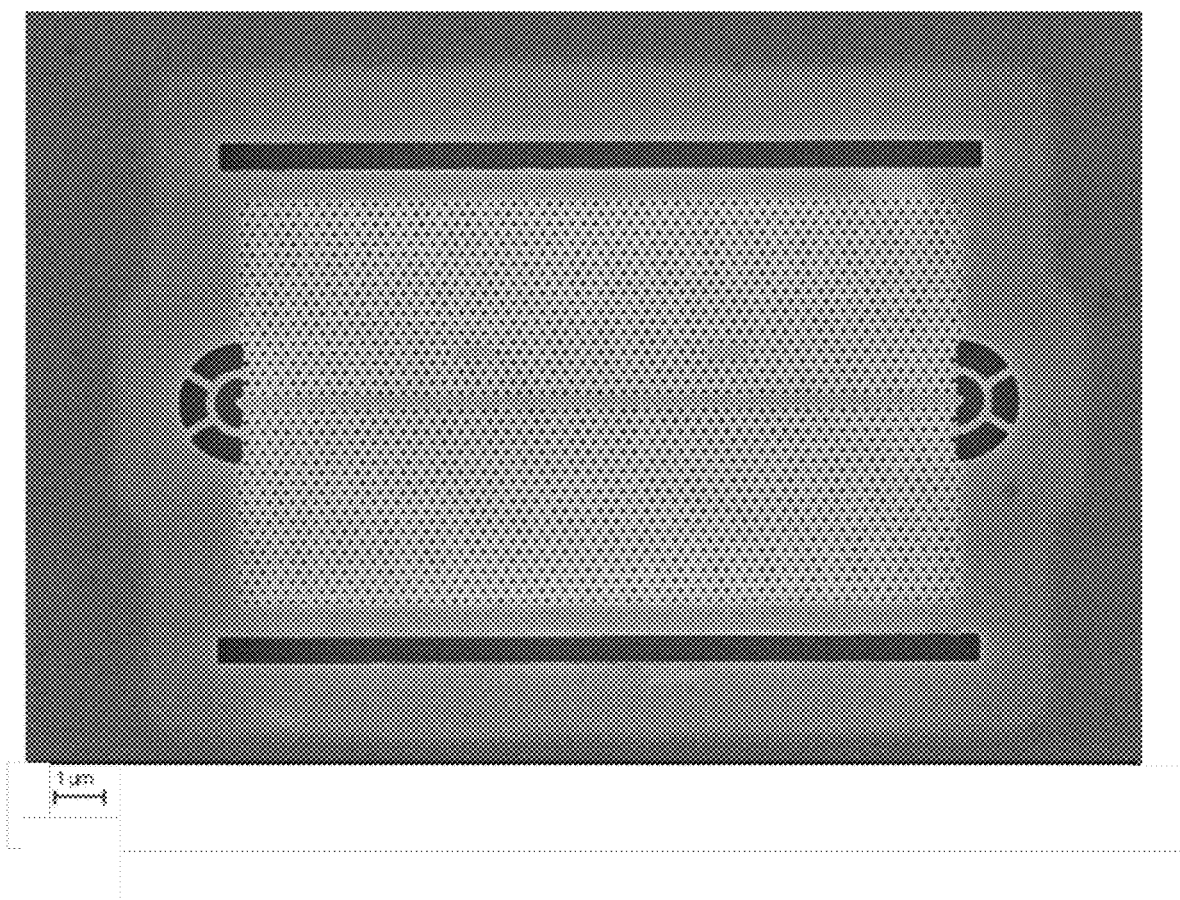
Figure 5A:
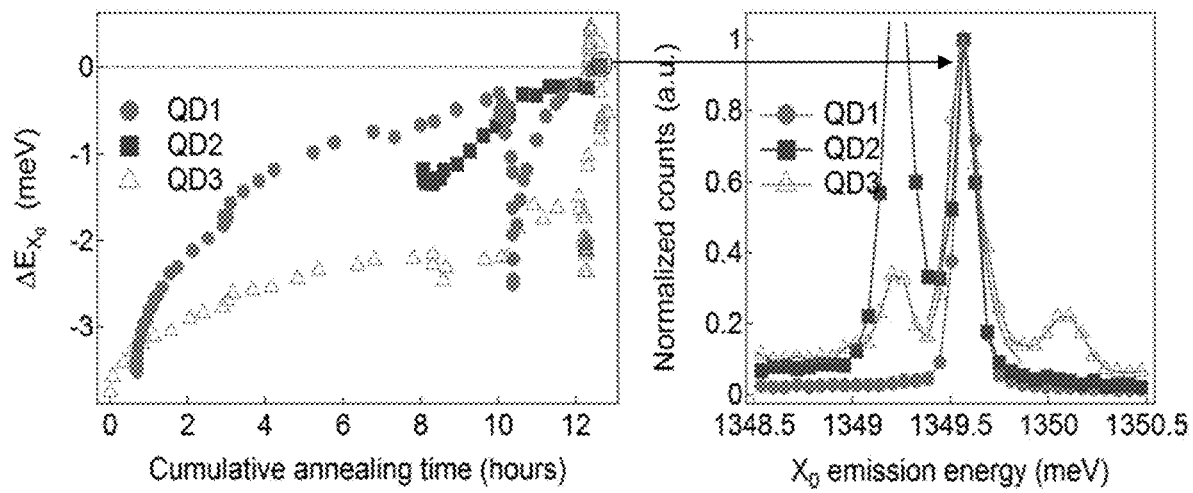
FIG. 5A shows an example of the tuning of the emissions from three QDs to the same frequency.
Figure 5B:
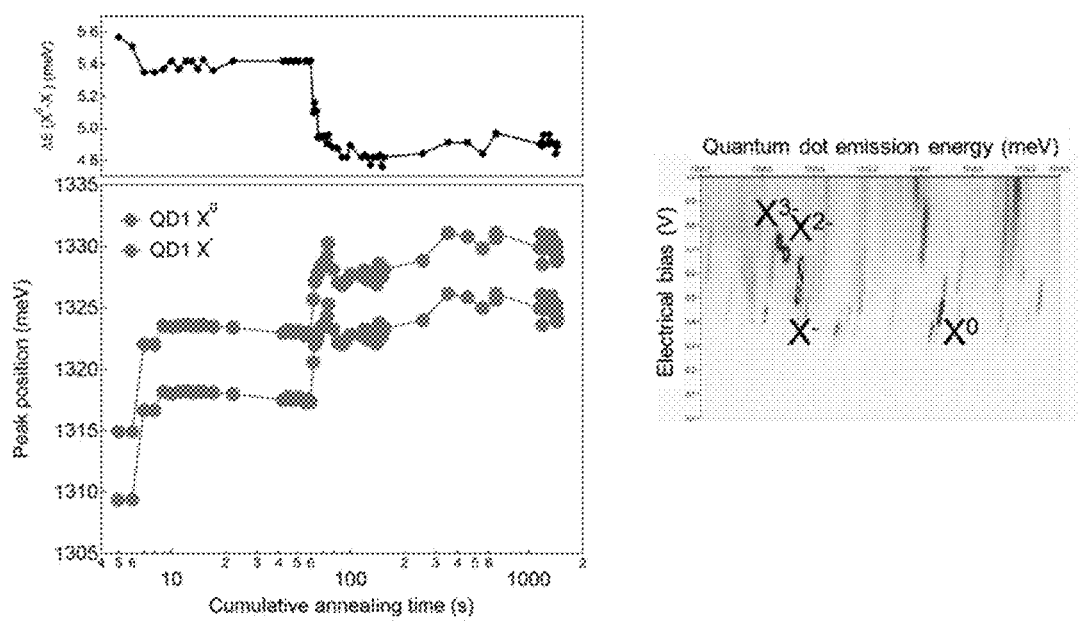
FIG. 5B shows the tuning of the emission frequency of a quantum dot in a photonic crystal waveguide. X0: neutral exciton and X-, X2-, X3-: single, double, and triple charge states.

A photonic crystal membrane that controls thermal diffusion enables a stable approach to the annealing temperature by increasing the laser power. FIG. 4 shows an exemplary such membrane. This involves creating thermal bottlenecks between the membrane and the surrounding GaAs substrate by introducing gaps between the membrane and substrate. Introducing drain lines in the photonic crystal waveguide/cavity structure is one way to accomplish this bottleneck. After the sample is fabricated, it is mounted in a micro-optics set up, where a laser is focused to a ~1 μm spot with a power 1-20 mW (spot size and power depend on the membrane size and geometry, as well as the lateral position of the quantum dot within the membrane).

Further Embodiments

Instead of using photonic crystal membranes with defect resonators and waveguides, other architectures such as microdisk resonators connected with bridge waveguides could be used.

While the proof of concept employed InAs/GaAs semiconductors, the technique could be extended to other QD semiconductor systems.

Instead of using this to create on-chip networks of single photon sources for quantum information technologies, the same device and technique can be used for creating classical photonic information processing networks such as a network of quantum dot lasers.

Concluding Remarks

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

What is claimed is:

1. A method of tuning quantum dot emission frequency, comprising:
   providing a plurality of quantum dots embedded in a photonic crystal membrane;
   conducting laser light treatment by directing laser light at one or more of the quantum dots, thereby causing a permanent shift in an emission frequency of the one or more quantum dots; and
   measuring the emission frequency of the one or more quantum dots following the laser light treatment and optionally conducting laser light treatment again.

2. The method of claim 1, wherein the quantum dots comprise InAs and the membrane comprises GaAs.

3. The method of claim 1, wherein the shift is of greater than 5 meV.

4. The method of claim 1, wherein the photonic membrane comprises a thermal bottleneck structure configured to regulate thermal diffusion.

* * * * *